United States Patent
Chiang et al.

(10) Patent No.: US 6,243,497 B1
(45) Date of Patent: *Jun. 5, 2001

(54) APPARATUS AND METHOD FOR OPTIMIZING THE RATE CONTROL IN A CODING SYSTEM

(75) Inventors: Tihao Chiang, Plainsboro; Ya-Qin Zhang, Cranbury, both of NJ (US)

(73) Assignee: Sarnoff Corporation, Princeton, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,349

(22) Filed: Feb. 11, 1998

Related U.S. Application Data (60) Provisional application No. 60/037,056, filed on Feb. 12, 1997.

(51) Int. Cl.[7] ....................................... G06K 9/36
(52) U.S. Cl. ............................. 382/251; 348/405
(58) Field of Search .................... 348/405, 390, 348/415, 416, 699, 403, 414, 417, 418, 419, 397; 358/136, 133, 105; 382/251, 250, 238, 236, 284, 294, 232

(56) References Cited

U.S. PATENT DOCUMENTS

| | | | |
|---|---|---|---|
| 5,134,476 | 7/1992 | Aravind et al. | 348/415.1 |
| 5,144,426 | 9/1992 | Tanaka et al. | 375/240.13 |
| 5,214,507 | 5/1993 | Aravind et al. | 348/390.1 |
| 5,231,484 | 7/1993 | Gonzales et al. | 375/240.04 |
| 5,237,410 | 8/1993 | Inoue | 375/240.12 |
| 5,245,427 | 9/1993 | Kunihiro | 348/400.1 |
| 5,253,059 | 10/1993 | Ansari et al. | 348/390.1 |
| 5,291,282 | 3/1994 | Nakagawa et al. | 375/240.23 |
| 5,333,012 | * 7/1994 | Singhal et al. | 375/240.04 |
| 5,440,345 | 8/1995 | Shimoda | 375/240.14 |
| 5,491,513 | 2/1996 | Wickstrom et al. | 375/240.25 |
| 5,576,767 | 11/1996 | Lee et al. | 375/240.14 |
| 5,594,504 | 1/1997 | Ebrahimi | 375/240.16 |
| 5,731,835 | * 3/1998 | Kuchibholta | 348/390.1 |
| 5,764,805 | * 9/1999 | Martucci et al. | 382/238 |
| 5,929,914 | * 10/1999 | Normand | 375/240.04 |
| 5,933,194 | * 10/1999 | Kim et al. | 348/403.1 |

OTHER PUBLICATIONS

"A New Rate Control Scheme Using Quadratic Rate Distortion Model", T. Chiang and Y–Q. Zhang, IEEE Transactions on Circuits and Systems for Video Technology, vol. 7, No. 1, Feb. 1997, pp. 246–250.

* cited by examiner

*Primary Examiner*—Joseph Mancuso
*Assistant Examiner*—Ali Bayat
(74) *Attorney, Agent, or Firm*—William J. Burke; John V. Silverio (57) ABSTRACT

A method and apparatus for selecting a quantizer scale for each frame to optimize the coding rate is disclosed. A quantizer scale is selected for each frame such that the target bit rate for the frame is achieved while maintaining a uniform visual quality over an entire sequence of frames.

21 Claims, 4 Drawing Sheets

APPARATUS AND METHOD FOR
OPTIMIZING THE RATE CONTROL IN A
CODING SYSTEM

This application claims the benefit of U.S. Provisional Application No. 60/037,056 filed Feb. 12, 1997, which is herein incorporated by reference.

The present invention relates to an apparatus and concomitant method for optimizing the coding of motion video. More particularly, this invention relates to a method and apparatus that recursively adjusts the quantizer scale for each frame to maintain the overall quality of the motion video while optimizing the coding rate.

BACKGROUND OF THE INVENTION

The Moving Picture Experts Group (MPEG) created the ISO/IEC international Standards 11172 and 13818 (generally referred to as MPEG-1 and MPEG-2 format respectively) to establish a standard for coding/decoding strategies. Although these MPEG standards specify a general coding methodology and syntax for generating an MPEG compliant bitstream, many variations are permitted to accommodate a plurality of different applications and services such as desktop video publishing, video conferencing, digital storage media and television broadcast.

In the area of rate control, MPEG does not define a specific method for controlling the bit rate of an encoder. It is the task of the encoder designer to devise a rate control process for controlling the bit rate such that the decoder input buffer neither overflows nor underflows.

Currently, one way of controlling the bit rate is to alter the quantization process, which will affect the distortion of the input video image. By altering the quantizer scale (step size), the bit rate can be changed and controlled.

Although changing the quantizer scale is an effective method of implementing the rate control of an encoder, it has been shown that a poor rate control process will actually degrade the visual quality of the video image, i.e., failing to alter the quantizer scale in an efficient manner such that it is necessary to drastically alter the quantizer scale toward the end of a picture to avoid overflow and underflow conditions. Since altering the quantizer scale affects both image quality and compression efficiency, it is important for a rate control process to control the bit rate without sacrificing image quality.

In the current MPEG coding strategies (e.g., various MPEG test models), the quantizer scale for each frame is selected by assuming that all the pictures of the same type have identical complexity within a group of pictures. However, the quantizer scale selected by this criterion may not achieve optimal coding performance, since the complexity of each picture will vary with time.

Furthermore, encoders that utilize global-type transforms, e.g., wavelet transform (otherwise known as hierarchical subband decomposition), have similar problems. For example, wavelet transforms are applied to an important aspect of low bit rate image coding: the coding of a binary map (a wavelet tree) indicating the locations of the non-zero values, otherwise known as the significance map of the transform coefficients. Quantization and entropy coding are then used to achieve very low bit rates. It follows that a significant improvement in the proper selection of a quantizer scale for encoding the significance map (the wavelet tree) will translate into a significant improvement in compression efficiency and coding rate.

Therefore, a need exists in the art for an apparatus and method that recursively adjusts the quantizer scale for each frame to maintain the overall quality of the video image while optimizing the coding rate.

SUMMARY OF THE INVENTION

The present invention is a method and apparatus for selecting a quantizer scale for each frame to maintain the overall quality of the video image while optimizing the coding rate. Namely, a quantizer scale is selected for each frame (picture) such that the target bit rate for the picture is achieved while maintaining a uniform visual quality over an entire sequence of pictures.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
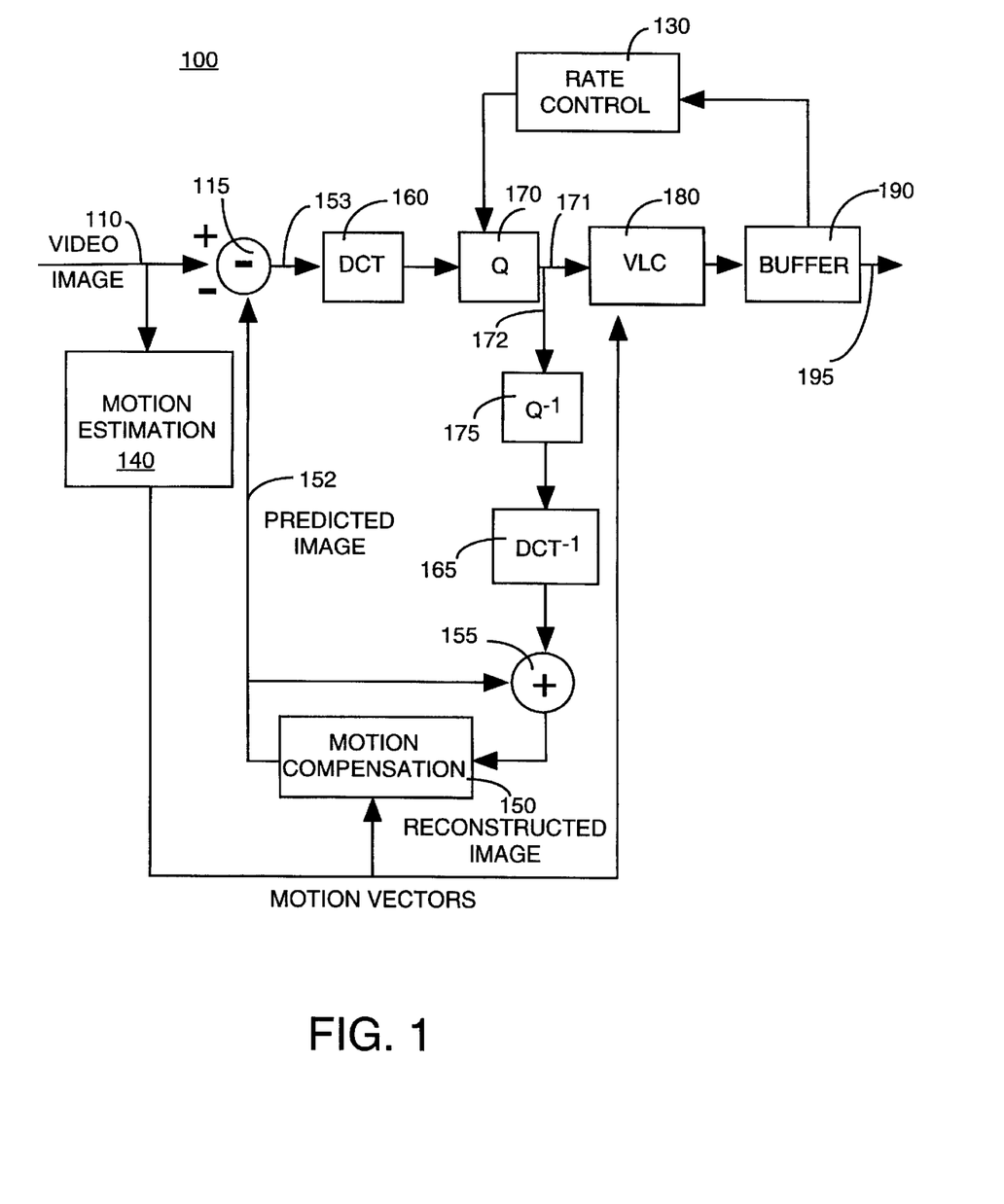
FIG. 1 illustrates a block diagram of the apparatus of the present invention.

FIG. 1 depicts a block diagram of the apparatus 100 of the present invention for deriving a quantizer scale for each frame to maintain the overall quality of the video image while controlling the coding rate. Although the present invention is described below with reference to a MPEG compliant encoder, those skilled in the art will realize that the present invention can be adapted to other encoders that are compliant with other coding/decoding standards.

In the preferred embodiment of the present invention, the apparatus 100 is an encoder or a portion of a more complex block-based motion compensation coding system. The apparatus 100 comprises a motion estimation module 140, a motion compensation module 150, a rate control module 130, a DCT module 160, a quantization (Q) module 170, a variable length coding (VLC) module 180, a buffer 190, an inverse quantization ($Q^{-1}$) module 175, an inverse DCT ($DCT^{-1}$) transform module 165, a subtractor 115 and a summer 155. Although the apparatus 100 comprises a plurality of modules, those skilled in the art will realize that the functions performed by the various modules are not required to be isolated into separate modules as shown in FIG. 1. For example, the set of modules comprising the motion compensation module 150, inverse quantization module 175 and inverse DCT module 165 is generally known as an "embedded decoder".

FIG. 1 illustrates an input video image (image sequence) on signal path 110 which is digitized and represented as a luminance and two color difference signals (Y, $C_r$, $C_b$) in accordance with the MPEG standards. These signals are further divided into a plurality of layers (sequence, group of pictures, picture, slice, macroblock and block) such that each picture (frame) is represented by a plurality of macroblocks.

Each macroblock comprises four (4) luminance blocks, one $C_r$ block and one $C_b$ block where a block is defined as an eight (8) by eight (8) sample array. The division of a picture into block units improves the ability to discern changes between two successive pictures and improves image compression through the elimination of low amplitude transformed coefficients (discussed below). The digitized signal may optionally undergo preprocessing such as format conversion for selecting an appropriate window, resolution and input format.

The input video image on path 110 is received into motion estimation module 140 for estimating motion vectors. A motion vector is a two-dimensional vector which is used by motion compensation to provide an offset from the coordinate position of a block in the current picture to the coordinates in a reference frame. The reference frames can be a previous frame (P-frame), or previous and/or future frames (B-frames). The use of motion vectors greatly enhances image compression by reducing the amount of information that is transmitted on a channel because only the changes between the current and reference frames are coded and transmitted.

The motion vectors from the motion estimation module 140 are received by the motion compensation module 150 for improving the efficiency of the prediction of sample values. Motion compensation involves a prediction that uses motion vectors to provide offsets into the past and/or future reference frames containing previously decoded sample values that are used to form the prediction error. Namely, the motion compensation module 150 uses the previously decoded frame and the motion vectors to construct an estimate of the current frame. Furthermore, those skilled in the art will realize that the functions performed by the motion estimation module and the motion compensation module can be implemented in a combined module, e.g., a single block motion compensator.

Furthermore, prior to performing motion compensation prediction for a given macroblock, a coding mode must be selected. In the area of coding mode decision, MPEG provides a plurality of different macroblock coding modes. Specifically, MPEG-2 provides macroblock coding modes which include intra mode, no motion compensation mode (No MC), frame/field/dual-prime motion compensation inter mode, forward/backward/average inter mode and field/frame DCT mode.

Once a coding mode is selected, motion compensation module 150 generates a motion compensated prediction (predicted image) on path 152 of the contents of the block based on past and/or future reference pictures. This motion compensated prediction on path 152 is subtracted via subtractor 115 from the video image on path 110 in the current macroblock to form an error signal or predictive residual signal on path 153. The formation of the predictive residual signal effectively removes redundant information in the input video image. It should be noted that if a current frame is encoded as an I-frame, then the signal on path 153 is simply the original picture and not a predictive residual signal.

The DCT module 160 then applies a forward discrete cosine transform process to each block of the predictive residual signal to produce a set of eight (8) by eight (8) block of DCT coefficients. The DCT basis function or subband decomposition permits effective use of psychovisual criteria which is important for the next step of quantization.

The resulting 8×8 block of DCT coefficients is received by quantization module 170 where the DCT coefficients are quantized. The process of quantization reduces the accuracy with which the DCT coefficients are represented by dividing the DCT coefficients by a set of quantization values with appropriate rounding to form integer values. The quantization values can be set individually for each DCT coefficient, using criteria based on the visibility of the basis functions (known as visually weighted quantization). Namely, the quantization value corresponds to the threshold for visibility of a given basis function, i.e., the coefficient amplitude that is just detectable by the human eye. By quantizing the DCT coefficients with this value, many of the DCT coefficients are converted to the value "zero", thereby improving image compression efficiency. The process of quantization is a key operation and is an important tool to achieve visual quality and to control the encoder to match its output to a given bit rate (rate control). Since a different quantization value can be applied to each DCT coefficient, a "quantization matrix" is generally established as a reference table, e.g., a luminance quantization table or a chrominance quantization table. Thus, the encoder chooses a quantization matrix that determines how each frequency coefficient in the transformed block is quantized.

However, subjective perception of quantization error greatly varies with the frequency and it is advantageous to use coarser quantization values for the higher frequencies. Namely, human perceptual sensitivity of quantization errors are lower for the higher spatial frequencies. As a result, high frequencies are quantized more coarsely with fewer allowed values than low frequencies. Furthermore, an exact quantization matrix depends on many external parameters such as the characteristics of the intended display, the viewing distance and the amount of noise in the source. Thus, it is possible to tailor a particular quantization matrix for an application or even for an individual sequence of frames. Generally, a customized quantization matrix can be stored as context together with the compressed video image. The proper selection of a quantizer scale is performed by the rate control module 130.

Next, the resulting 8×8 block of quantized DCT coefficients is received by variable length coding (VLC) module 180 via signal connection 171, where the two-dimensional block of quantized coefficients is scanned in a "zig-zag" order to convert it into a one-dimensional string of quantized DCT coefficients. This zig-zag scanning order is an approximate sequential ordering of the DCT coefficients from the lowest spatial frequency to the highest. Variable length coding (VLC) module 180 then encodes the string of quantized DCT coefficients and all side-information for the macroblock using variable length coding and run-length coding.

The data stream is received into a "First In-First Out" (FIFO) buffer 190. A consequence of using different picture types and variable length coding is that the overall bit rate into the FIFO is variable. Namely, the number of bits used to code each frame can be different. In applications that involve a fixed-rate channel, a FIFO buffer is used to match the encoder output to the channel for smoothing the bit rate. Thus, the output signal of FIFO buffer 190 on path 195 is a compressed representation of the input video image on path 110 (or a compressed difference signal between the input image and a predicted image), where it is sent to a storage medium or telecommunication channel via path 195.

The rate control module 130 serves to monitor and adjust the bit rate of the data stream entering the FIFO buffer 190 to prevent overflow and underflow on the decoder side (within a receiver or target storage device, not shown) after transmission of the data stream. Thus, it is the task of the rate control module 130 to monitor the status of buffer 190 to control the number of bits generated by the encoder.

In the preferred embodiment of the present invention, rate control module 130 selects a quantizer scale for each frame to maintain the overall quality of the video image while controlling the coding rate. Namely, a quantizer scale is selected for each frame such that target bit rate for the picture is achieved while maintaining a uniform visual quality over the entire sequence of pictures.

It should be understood that although the present invention is described with an encoder implementing temporal (e.g., motion estimation/compensation) and spatial encoding (e.g., discreet cosine transform), the present invention is not so limited. Other temporal and spatial encoding methods can be used, including no use of any temporal and spatial encoding.

Specifically, the rate control module 130 initially obtains a rough estimate of the complexity of a specific type of picture (I, P, B) from previously encoded pictures or by implementing various MPEG test models. This estimated complexity is used to derive a predicted number of bits necessary to code each frame. With this knowledge, a quantizer scale is calculated for the frame in accordance with a complexity measure having a polynomial form. This complexity measure is derived to meet the constraint that the selected quantizer scale for the frame should approach the target bit rate for the picture. Once the frame is encoded, the rate control module recursively adjusts the complexity measure through the use of a polynomial regression process. That is, the actual number of bits necessary to code the macroblock is used to refine the complexity measure so as to improve the prediction of a quantizer scale for the next frame. A detailed description of the quantizer scale selection method is discussed below with reference to FIG. 2.

Returning to FIG. 1, the resulting 8×8 block of quantized DCT coefficients from the quantization module 170 is also received by the inverse quantization module 175 via signal connection 172. At this stage, the encoder regenerates I-frames and P-frames of the input video image by decoding the data so that they are used as reference frames for subsequent encoding.

The resulting dequantized 8×8 block of DCT coefficients are passed to the inverse DCT module 165 where inverse DCT is applied to each macroblock to produce the decoded error signal. This error signal is added back to the prediction signal from the motion compensation module via summer 155 to produce a decoded reference picture (reconstructed image).

Figure 2:
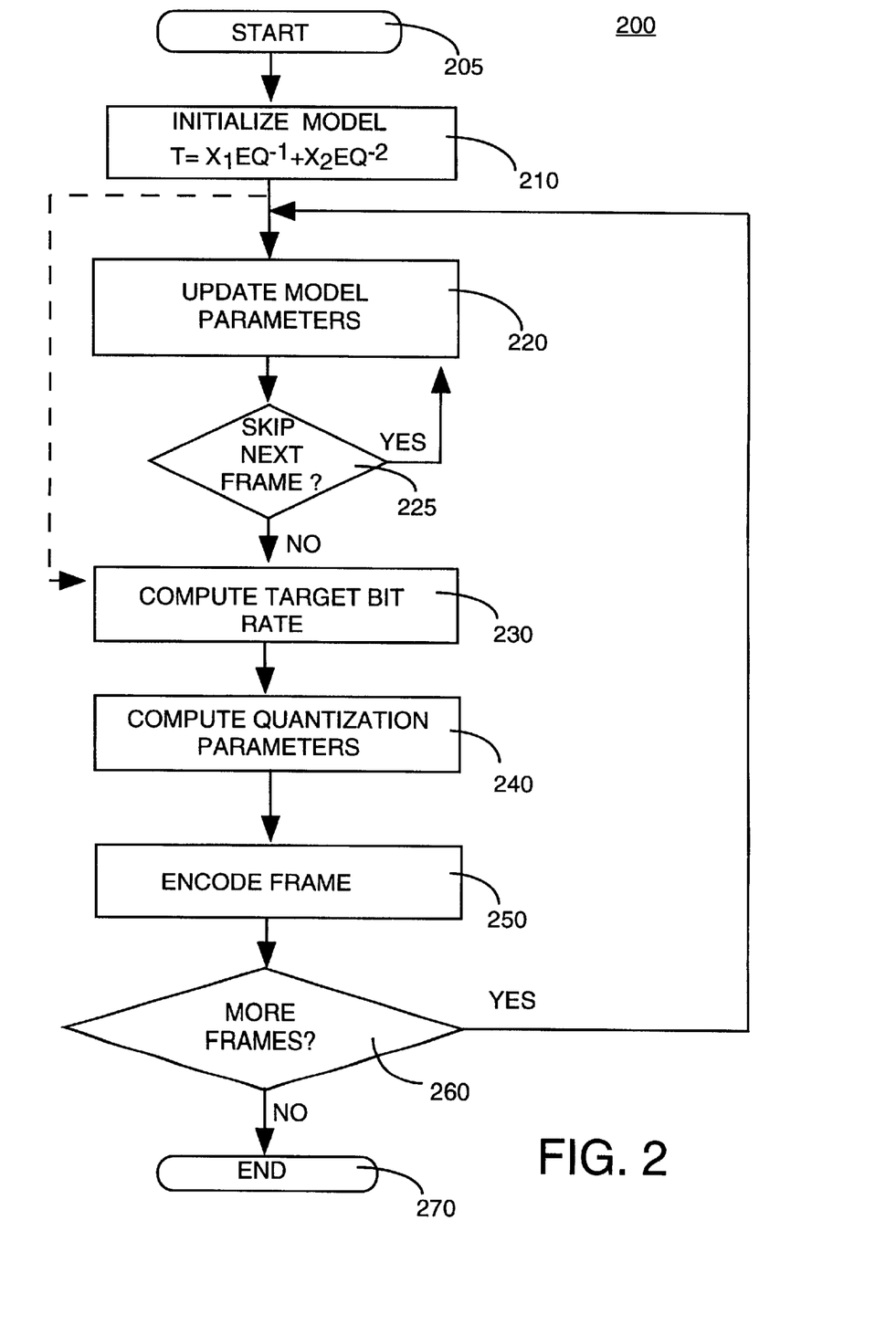
FIG. 2 illustrates a flowchart for deriving the optimal quantizer scale in accordance with a complexity measure for controlling the bit rate of the apparatus.

FIG. 2 depicts a flowchart for deriving the optimal quantizer scale in accordance with a complexity measure for controlling the bit rate of the apparatus in the preferred embodiment of the present invention. The method 200 of the present invention as depicted in FIG. 2 is formulated to derive a quantizer scale for each frame. The solution should satisfy the target bit rate while maintaining a relatively uniform visual quality from one picture or another.

Referring to FIG. 2, the method begins at step 205 and proceeds to step 210 where the method adopts an initial measure having the relationship of:

$$T = X_1 E Q^{-1} + X_2 E Q^{-2} \tag{1}$$

T represents the target number of bits (encoding bit count) that are available to encode a particular frame. Q represents a quantization level scale selected for the frame. E represents a distortion measure. In the preferred embodiment, E represents a mean absolute difference for the current frame after performing motion compensation. Namely, the measure E provides a method of adjusting the frame bit budget to account for the difference between successive frames in a sequence. E is computed by summing the differences between a current frame and a previous frame from block to block and computing a mean absolute difference measure. In other words, the greater the differences between a current frame and a previous frame, the greater the number of bits that will be required to code the current frame. Furthermore, other distortion measures can be used, such that E may represent mean square error or just-noticeable difference (jnd).

The parameters of equation (1) and other pertinent parameters are briefly described below and further defined with subscripts as follows:

$R_s$: bit rate for the sequence (or segment). (e.g., 24000 bits/sec)

$R_f$: bits used for the first frame. (e.g., 10000 bits)

$R_c$: bits used for the current frame. It is the bit count obtained after encoding.

$R_p$: bits to be removed from the buffer per picture.

$T_s$: number of seconds for the sequence (or segment). (e.g., 10 sec)

$E_c$: mean absolute difference for the current frame after motion compensation.

$Q_c$: quantization level used for the current frame.

$N_r$: number of P frames remaining for encoding.

$N_s$: distance between encoded frames. (e.g., 4 for 7.5 fps)

$R_r$: number of bits remaining for encoding this sequence (or segment).

T: target bit to be used for the current frame.

$S_p$: number of bits used for encoding the previous frame.

$H_c$: header and motion vector bits used in the current frame.

$H_p$: header and motion vector bits used in the previous frame.

$Q_p$: quantization level used in the previous frame.

$B_s$: buffer size e.g., $R_s/2$.

B: current buffer level eg., $R_s/4$—start from the middle of the buffer.

More specifically, in step 210, the parameters $X_1$ and $X_2$ are initialized as follows:

$$X_1 = (R_s * N_s)/2$$

$$X_2 = 0 \tag{2}$$

$R_s$ represents the bit rate for the sequence (or segment), e.g., 24000 bits per second. $N_s$ represents the distance between encoded frames. Namely, due to low bit rate applications, certain frames within a sequence may not be encoded (skipped), e.g., the encoder may only encode every fourth frame. It should be understood that the number of skipped frames can be tailored to the requirement of a particular application.

Although the present invention is described below with reference to a sequence of frames, e.g., 300 frames per sequence, those skilled in the art will realize that the present invention is not so limited. In fact, the present invention can be applied to a continuous sequence (real-time) or sequences of any length, where the method is re-initialized periodically or at predefined intervals.

With values for the parameters $X_1$ and $X_2$, the method 200 then initializes other parameters as follows:

$$R_r = T_s * R_s - R_f \quad (3)$$

$$R_p = R_r / N_r \quad (4)$$

$R_r$ represents the number of bits remaining for encoding a sequence (or segment). $T_s$ represents the number of seconds for the sequence (or segment), e.g., if a sequence contains 300 frames with a frame rate of 30 frames per second, then $T_s$ is 300/30=10 seconds.

$R_f$ represents the number of bits used for the first frame, where the frame is typically encoded as an "I" frame. Method 200 can allocate $R_f$ with a particular value, e.g., 10000 bits.

With $R_r$, method 200 computes $R_p$ which represents the number of bits to be removed from the buffer per frame. $N_r$ represents the number of frames (P) remaining for encoding.

Once initialization is completed, method 200 proceeds to step 220, where the parameters $X_1$ and $X_2$ for the measure are updated. However, the measure is generally not updated after initialization, since there is insufficient information at that point to refine the measure, e.g., encoding the first frame. Nevertheless, there are situations where there may be prior information which is available to update the measure, e.g., re-initialization at the end of a predefined sequence or re-initialization after an interruption. Steps 220 and 225 are discussed below. As such, method 200 proceeds directly to step 230 (as shown by the dashed line in FIG. 2).

In step 230, method 200 computes a target bit rate for a current frame before encoding the current frame as follows:

$$T = \text{Max}(R_s/30, R_r/N_r * a + S_p * b) \quad (5)$$

T represents the target bit to be used for the current frame. $S_p$ represents the number of bits used for encoding the previous frame. In the preferred embodiment, the values 0.95 and 0.05 are selected for the constants a and b respectively in equation (5). However, the present invention is not so limited. Other values can be employed. In fact, these values can be adjusted temporally.

It should be noted that equation (5) allows T to take the greater (max) of two possible values. First, the target bit rate is computed based on the bits available and the last encoded frame bits. If the last frame is complex and uses many bits, it leads to the premise that more bits should be assigned to the current frame. However, this increased allocation will diminish the available number of bits for encoding the remaining frames, thereby limiting the increased allocation to this frame. A weighted average reflects a compromise of these two factors, as illustrated in the second term in equation (5).

Second, a lower bound of target rate ($R_s/30$) is used to maintain or guarantee a minimal quality, e.g., 800 bits/frame can be set as a minimum. If the minimal quality cannot be maintained, the encoder has the option to skip the current frame altogether.

The target bit rate of equation (5) is then adjusted according to the buffer status to prevent both overflow and underflow as follows:

$$T' = T * (B + c * (B_s - B)) / (c * B + (B_s - B)) \quad (6)$$

T' is the adjusted target bit rate, $B_s$ is the total buffer size, c is a constant selected to be a value of 2 (other values can be used) and B is the portion of the buffer that contains bits to be sent to the decoder. As such $B_s - B$ is the remaining space in the buffer. Equation (6) indicates that if the buffer is more than half full, the target bit rate T' is decreased. Conversely, if the buffer is less than half full, the target bit rate T' is increased. If the buffer is exactly at half, no adjustment is necessary, since equation (6) reduces to T'=T.

Furthermore, adjustment of the target bit rate may have to undergo further adjustments in accordance with equations (7a–b) which are expressed as:

if $(B + T' > 0.9 * B_s)$, then $T'' = \text{Max}(R_s/30, 0.9 * B_s - B)$ (7a)

if $(B - R_{r T'} > 0.1 * B_s)$, then $T'' = R_p - B + 0.1 * B_s$ (7b)

where T'' is the second adjusted target bit rate. Equation (7a) is designed to avoid the overflow condition by limiting (clamping) the adjustment of the target bit rate. Namely, the sum of the computed target bit rate T' for a current frame and the current buffer fullness must not exceed 90% of the buffer capacity. Operating too close to the buffer capacity places the encoder in danger of creating a pending overflow condition, i.e., if there is a sudden change in the complexity of the next frame, e.g., scene cut or excessive motion. Again, if T'' is less than a lower bound ($R_s/30$), then the encoder has the option of skipping the frame.

In contrast, Equation (7b) is designed to avoid the underflow condition by modifying the adjustment of the target bit rate. Namely, the sum of the computed target bit rate T' and the current buffer fullness must not fall below 10% of the buffer capacity. Operating too close to an empty buffer places the encoder in danger of creating a pending underflow condition, i.e., if there is little change in the complexity of the next frame, e.g., no motion at all in the next frame. Once the target bit rate is computed, method 200 proceeds to step 240.

In step 240, method 200 calculates a quantization scale or level for the current frame as follows:

$$T''' = \text{Max}(R_p/3 + Hp, T'') \quad (8a)$$

$$\text{if}(X_2 = 0) \ Q_c = X_1 * E_c / (T''' - H_p) \quad (8b);$$

$$\text{else } Q_c = (2 * X_2 * E_c) / (\text{sqrt}((X_1 * E_c)^2 + 4 * X_2 * E_c * (T''' - H_p)) - X_1 * E_c) \quad (8c)$$

where $Q_c$ is the computed quantization scale for the current frame, $H_p$ is the number of bits used to encode the header and motion vectors of the previous frame, and $E_c$ is the mean absolute difference for the current frame after motion compensation. Namely, equations (8b) and (8c) are first and second order equation respectively, where $Q_c$ can be easily calculated. Equation (8a) is another target bit rate adjustment that is employed to ensure that the target bit rate is greater than the bit rate assigned for the header.

Although the preferred embodiment of the present invention employs a complexity measure using a second order equation, it should be understood that other order equations can be used, e.g., third order and so on at greater computational cost. Additionally, although the preferred embodiment of the present invention employs a series of target bit rate adjustments, it should be understood that these target bit rate adjustments can be omitted to reduce computational overhead. However, without the target bit rate adjustments, the risk of an underflow or overflow condition is increased.

Furthermore, the target bit rate for the current frame is adjusted by the amount of bits that are needed to encode the header, motion vectors and other information associated with the current frame. Since the size of the header and other information generally do not vary greatly from frame to frame, the number of bits, $H_p$, used to encode the header and motion vectors of the previous frame, provides an adequate approximation of the bits needed to encode the header information for the current frame.

As such, another manner of expressing equation (1) above is $$T - H_p = X_1 E Q^{-1} + X_2 E Q^{-2} \qquad (9)$$

since the selection of the quantization level does not affect the coding of the header and motion vectors.

In addition, the calculated quantization scale, $Q_c$, may have to be adjusted to ensure uniform visual quality from frame to frame as follows:

$$Q_c = \text{Min}(\text{ceil}(Q_p * 1.25), Q_c, 31) \qquad (10a)$$

$$Q_c = \text{Max}(\text{ceil}(Q_p * 0.75), Q_c, 1) \qquad (10b)$$

where $Q_c'$ is the adjusted quantization scale and $Q_p$ is the quantization level used in the previous frame. The calculated $Q_c$ is limited or clipped in accordance with the equations (10a) and (10b). Namely, $Q_C$ can be calculated in accordance with equation (10a) by selecting the smaller value of either the calculated $Q_c$, 125% of the previous quantization level used in the previous frame, $Q_p$, or the maximum quantizer level of 31 (set by the MPEG standards). Similarly, $Q_c$ can be calculated in accordance with equation (10b) by selecting the larger value of either the calculated $Q_c$, 75% of the previous quantization level used in the previous frame, $Q_p$, or the minimum quantizer level of 1 (set by the MPEG standards). Generally, quantization levels are rounded to integer values. Equation (10a) is used to calculate $Q_c'$ under the condition of $Q_c > Q_p$, else, equation (10b) is used.

Equations 10a–10b serve to limit sudden changes in the quantization levels between frames, which may, in turn, cause noticeable change in the visual quality of the decoded pictures. In this manner, the quantizer level is calculated for each frame to maintain the overall quality of the motion video while optimizing the coding rate. Once the quantization level is computed for the current level, method 200 proceeds to step 250.

In step 250, the method encodes the current frame using the quantization level calculated from step 240 to produce $R_c$, which represents the actual number of bits resulting from encoding the current frame. With $R_c$, certain parameters of the complexity measure are updated as follows:

$$B = B + R_c - R_p \qquad (11)$$

$$R_r = R_r - R_c \qquad (12)$$

$$S_p = R_c \qquad (13)$$

$$H_p = H_c \qquad (14)$$

$$Q_p = Q_c \qquad (15)$$

$$N_r = N_r - 1 \qquad (16)$$

First, the buffer fullness B is updated by the addition of the bits $R_c$ and the removal (transmission) of the bits $R_p$. Second, $R_r$, the total remaining number of bits available for the sequence is updated by the amount $R_c$. Third, $S_p$ is replaced with $R_c$. Fourth, $H_p$ is replaced with $H_c$. Fifth, $Q_p$ is replaced with $Q_c$. Finally, $N_r$ is decremented by one.

In step 260, method 200 queries whether there are additional frames that remain to be coded in the current sequence. If the query is affirmatively answered, method 200 returns to step 220 where the method 200 applies the updated $Q_c$, $R_c$, $H_p$ and $E_c$ in a polynomial regression model or a quadratic regression model to refine the complexity measure of equation (1) or (9). Namely, the constants $X_1$ and $X_2$ are updated to account for the discrepancy between the bits allocated to a frame and the actual number of bits needed to the code the frame for a particular quantizer level. Regression models are well known in the art. For a detailed discussion of various regression models, see e.g., Bowerman and O'Connell, *Forecasting and Time Series*, 3rd Edition, Duxbury Press, (1993, chapter 4). A second embodiment for updating the complexity measure is provided below. Method 200 then proceeds to step 225.

In step 225, method 200 queries whether the next frame in the sequence should be skipped. If the query is negatively answered, method 200 proceeds to step 230 as discussed above. If the query is affirmatively answered, method 200 returns to step 220 where the B and $R_p$ are updated. The decision to skipped a frame is determined in accordance with:

$$\text{if } (B > 0.8 * B_s) \text{ then skip next frame} \qquad (17)$$

Namely, the buffer fullness is checked again to determine if it is too close to the buffer's capacity, e.g., above 80% capacity. This verification of the buffer fullness permits the encoder to quickly determine whether it is necessary to compute the target rate for the current frame. If the buffer is very close to its capacity, there is a likelihood that an overflow condition is pending, e.g., the transmission channel is down or the encoder received several very complex frames. Due to real time demands, the encoder can quickly make the decision now to discard a frame without having to spend computation cycles and arrive to this same decision at a later time. Although 80% is selected for the preferred embodiment, other buffer capacity limit can be chosen for a particular application.

If a frame is discarded, method 200 returns to step 220, where the parameters $N_r$ and B are updated as follows:

$$B = B - R_p \qquad (18)$$

$$N_r = N_r - 1. \qquad (19)$$

Method 200 then returns to step 225 and again queries whether the next frame in the sequence should be skipped. If the query is negatively answered, method 200 proceeds to step 230 as discussed above. If the query is affirmatively answered, method 200 skips another frame and so on. Method 200 will end at step 270 when all the frames are encoded for a sequence.

The present invention provides a second embodiment for updating the complexity measure. The discussion will use the following definitions:

$Q_p[w]$: quantization levels for the past frames $R_p[w]$: scaled encoding complexities used for the past frames;

w: number of encoded past frames;

x: matrix contains $Q_p$;

y: matrix contains $Q_p * (R_c - H_c) / E_c$;

$E_p$: mean absolute difference for the previous frame. This is computed after motion compensation for the Y component only. No normalization is necessary since the measure is a linear function of $E_p$.

The method collects a variety of information related to previously encoded frames. More specifically, a number (or window, w) of quantization levels and scaled encoding complexities that were used for previous frames are collected into two matrices, i.e., $R_{p[n]} \leftarrow (R_c - H_c)/E_c$ and $Q_{p[n]} \leftarrow Q_c$. The selection of w is selected in accordance with:

$$w = \text{Min}(\text{total\_data\_number}, 20) \quad (20)$$

Namely, the window size is limited to the maximum value of twenty (20). The reason is that information pertaining to "older" encoded frames is less informative as to the complexity of a current frame. By limiting the size of the window, the computational expense is minimized.

However, the value for w can be adaptively adjusted in accordance with:

if $(E_p > E_c)$, then $w = \text{ceil}(E_c/E_p * w)$;

else $w' = \text{ceil}(E_p/E_c * w) \quad (21)$ to produce a "sliding window" w'. The data points are selected using a window whose size depends on the change in complexity. If the complexity changes significantly, a smaller window with more recent data points (previously encoded frames) is used. Namely, the mean absolute differences for the previous and current frames are used to reduce the predetermined size of w. $E_p$ is updated after each frame with $E_c$.

The method then performs an estimating (estimator) function to determine $X_1$ and $X_2$ in accordance with:

if (all $Q_p[i]$ are the same), then $X_1 = y[i]/w$ and $X_2 = 0$ else $b = (x\_\text{Transpose} * x)^{-1} * x\_\text{Transpose} * y$;

$2 \times 1 = (2 \times w * w \times 2)^{-1} * (2 \times w) * (w * 1) \quad (22)$ $X_1 = b(1,1)$ and $X_2 = b(2,1)$ where $x = [1, Q_p[i]^{-1}](i=1,2, \ldots w)]$ (dimension $w \times 2$) and $y = (Q_p[i](i=1,2, \ldots w)]$ (dimension $w \times 1$).

Once $X_1$ and $X_2$ are determined, the method performs a "Remove Outlier" operation in accordance with:

$\text{std} += ((X_1 * E_c Q_p[i]^{-1} + X_2 * E_c * Q_p[i]^{-2} - R_p[i] * E_c))^2$;

$\text{error}[i] = X_1 * E_c * Q_p[i]^{-1+X}{}_2 * E_c * Q_p[i]^{-2} - R_p[i] * E_c$;

set threshold = sqrt(std/w); (23)

if (abs(error[i]) > threshold), then remove data point I from matrix x and y for the estimator above.

Namely, the operation of equation (23) serves to remove data points that are above a certain threshold which affect the estimation operation of equation (22) above. Once the "Remove Outlier" operation is completed, the method again returns to the estimating function of equation (22) and again determine $X_1$ and $X_2$ without the outlier data points. Thus, the complexity measure is calibrated again by rejecting the outlier data points. The rejection criteria is that data point is discarded when the prediction error is more than one standard deviation.

Figure 3:
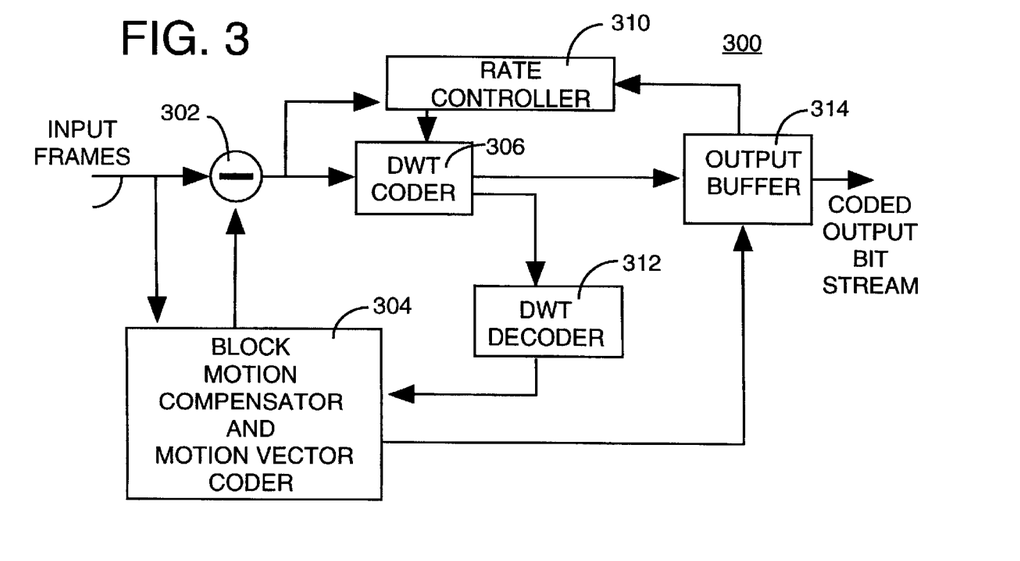
FIG. 3 illustrates a block diagram of a second embodiment of the apparatus of the present invention.

FIG. 3 depicts a wavelet-based encoder 300 that incorporates the present invention. The encoder contains a block motion compensator (BMC) and motion vector coder 304, subtractor 302, discrete wavelet transform (DWT) coder 306, bit rate controller 310, DWT decoder 312 and output buffer 314.

In general, as discussed above the input signal is a video image (a two-dimensional array of pixels (pels) defining a frame in a video sequence). To accurately transmit the image through a low bit rate channel, the spatial and temporal redundancy in the video frame sequence must be substantially reduced. This is generally accomplished by coding and transmitting only the differences between successive frames. The encoder has three functions: first, it produces, using the BMC and its coder 304, a plurality of motion vectors that represent motion that occurs between frames; second, it predicts the present frame using a reconstructed version of the previous frame combined with the motion vectors; and third, the predicted frame is subtracted from the present frame to produce a frame of residuals that are coded and transmitted along with the motion vectors to a receiver.

Figure 4:
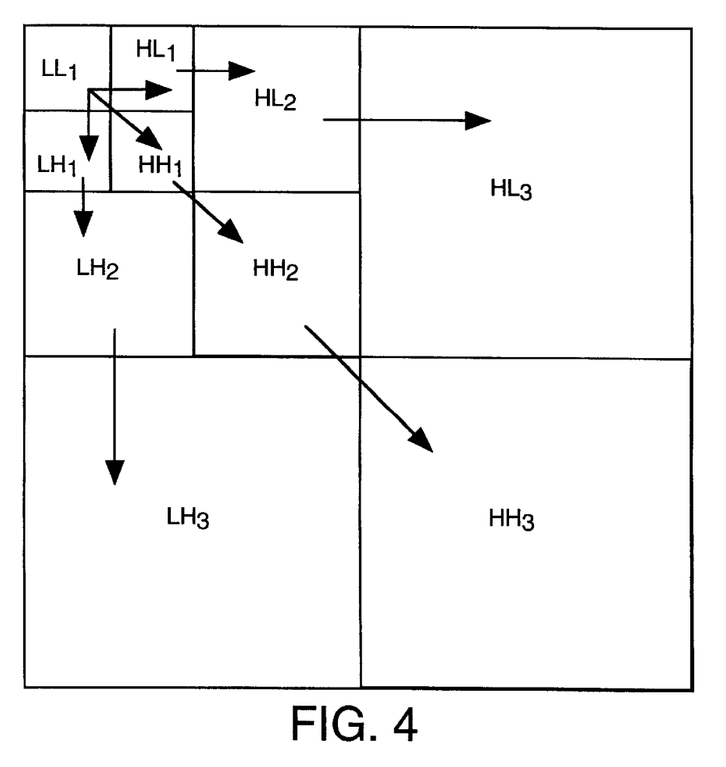
FIG. 4 is a graphical representation of a wavelet tree.

The discrete wavelet transform performs a wavelet hierarchical subband decomposition to produce a conventional wavelet tree representation of the input image. To accomplish such image decomposition, the image is decomposed using times two subsampling into high horizontal-high vertical (HH), high horizontallow vertical (HL), low horizontal-high vertical (LH), and low horizontallow vertical (LL), frequency subbands. The LL subband is then further subsampled times two to produce a set of HH, HL, LH and LL subbands. This sub sampling is accomplished recursively to produce an array of subbands such as that illustrated in FIG. 4 where three subsamplings have been used. Preferably six subsamplings are used in practice. The parent-child dependencies between subbands are illustrated as arrows pointing from the subband of the parent nodes to the subbands of the child nodes. The lowest frequency subband is the top left $LL_1$, and the highest frequency subband is at the bottom right $HH_3$. In this example, all child nodes have one parent. A detailed discussion of subband decomposition is presented in J. M. Shapiro, "Embedded Image Coding Using Zerotrees of Wavelet Coefficients", IEEE Trans. on Signal Processing, Vol. 41, No. 12, pp. 3445–62, December 1993.

The DWT coder of FIG. 3 codes the coefficients of the wavelet tree in either a "breadth first" or "depth first" pattern. A breadth first pattern traverse the wavelet tree in a bit-plane by bit-plane pattern, i.e., quantize all parent nodes, then all children, then all grandchildren and so on. In contrast, a depth first pattern traverses each tree from the root in the low-low subband ($LL_1$) through the children (top down) or children through the low-low subband (bottom up). The selection of the proper quantization level by the rate controller 310 is as discussed above to control the bit rate for each frame within a sequence.

As such, the present invention can be adapted to various types of encoders that use different transforms. Furthermore, the present invention is not limited to the proper selection of a quantization level to a frame. The present invention can be applied to a macroblock, a slice, or object, e.g., foreground, background, or portions of a person's face. Namely, the rate control method can be applied to a sequence of macroblocks, slices or objects, where the complexity measure is applied to determine a target bit rate for a current macroblock, slice or object to effect an optimal rate control scheme for the encoder, using previously encoded portions of the image sequence, for example a previously encoded macroblock, slice or object and windows thereof. For example, in a particular application such as a video-phone, the foreground object(s), e.g., the head and shoulders of a caller, are selected for quantization with more accuracy than the background objects.

Finally, although the above invention is discussed with reference to a P frame, the present invention can be applied to B frames as well.

Figure 5:
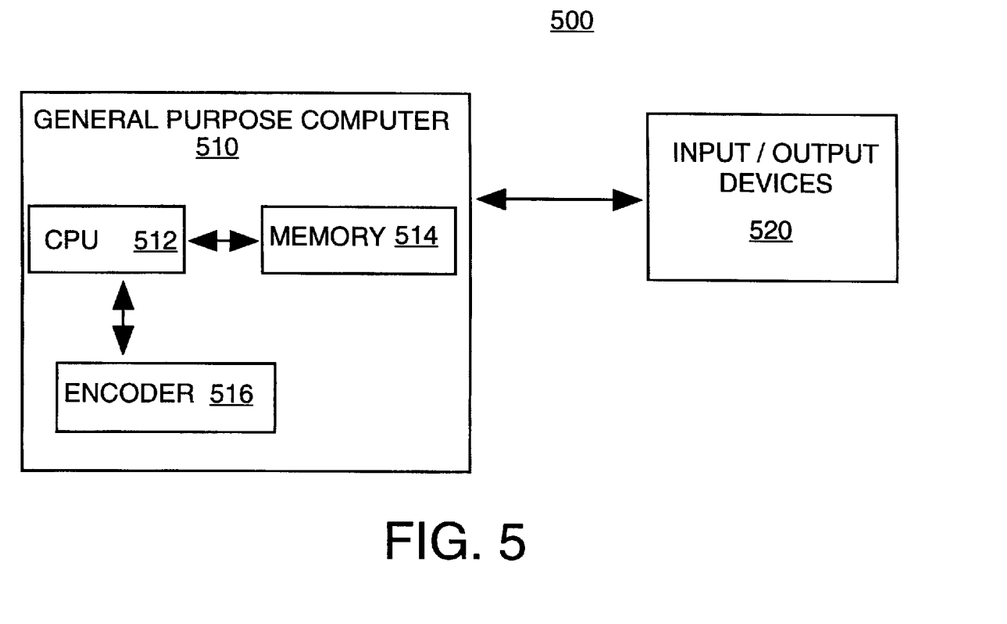
FIG. 5 illustrates an encoding system of the present invention.

FIG. 5 illustrates an encoding system 500 of the present invention. The encoding system comprises a general purpose computer 510 and various input/output devices 520. The general purpose computer comprises a central processing unit (CPU) 512, a memory 514 and an encoder 516 for receiving and encoding a sequence of images.

In the preferred embodiment, the encoder 516 is simply the encoder 100 and/or encoder 300 as discussed above. The encoder 516 can be a physical device which is coupled to the CPU 512 through a communication channel. Alternatively, the encoder 516 can be represented by a software application which is loaded from a storage device and resides in the memory 512 of the computer. As such, the encoder 100 and 300 of the present invention can be stored on a computer readable medium.

The computer 510 can be coupled to a plurality of input and output devices 520, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bitstreams or to receive the sequence of video images from a storage device or an imaging device.

There has thus been shown and described a novel apparatus and method that recursively adjusts the quantizer scale for each frame to maintain the overall quality of the video image while optimizing the coding rate. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention.

What is claimed is:

1. Method for generating a quantizer scale to quantize an image signal having at least one frame, said method comprising the steps of:

(a) computing a distortion measure for a current frame in response to coding information from an immediate previous encoded portion;

(b) computing a target number of bits for encoding said current frame;

(c) computing at least one quantizer scale for said current frame from the computed distortion measure and computed target number of bits in accordance with a complexity measure having a polynomial form, where said polynomial form has at least two distortion measure terms, with each having a different weight; and (d) applying said computed quantizer scale to quantize said current frame.

2. The method of claim 1, wherein said complexity measure comprises:

$$T = X_1 E Q^{-1} + X_2 E Q^{-2}$$

where T represents a target number of bits for encoding said current frame, $X_1$ and $X_2$ represent parameters, Q represents said quantization scale and E represents said distortion measure.

3. The method of claim 2, wherein said computed quantizer scale Q is adjusted in accordance with:

$$Q_c' = \text{Min}(\text{ceil}(Q_p*1.25), Q_c, 31) \text{ and}$$

$$Q_c' = \text{Max}(\text{ceil}(Q_p*0.75), Q_c, 1)$$

where $Q_c'$ represents the adjusted quantization scale and $Q_p$ represents a quantizer scale used in a previous frame.

4. The method of claim 2, further comprising the steps of:

(e) updating parameters $X_1$ and $X_2$ using $R_c$, where $R_c$ represents an actual number of bits from encoding said current frame using said calculated quantizer scale, Q; and (f) repeating the steps of (a)–(e) for a next frame of the image signal.

5. The method of claim 2, further comprising the steps of:

(e) updating parameters $X_1$ and $X_2$ using a window of information related to a plurality of previously encoded frames; and (f) repeating the steps of (a)–(e) for a next frame of the image signal.

6. The method of claim 2, wherein said target number of bits, T, is computed in accordance with:

$$T = \text{Max}(R_s/30, R_r/N_r*a + S_p*b)$$

where $R_r$ represents a number of bits remaining for encoding the image signal, $N_r$ represents a number of frames remaining to be encoded, $S_p$ represents a number of bits used for encoding a previous frame, a and b represent constants and $R_s$ represents a bit rate for the image signal.

7. The method of claim 6, wherein said target number of bits, T, is adjusted in accordance with:

$$T' = T*(B + c*(B_s - B))/(c*B + (B_s - B))$$

where T' represents an adjusted target bit rate, $B_s$ represents a total buffer size, c represents a constant and B represents a portion of said buffer that contains bits to be sent to a decoder.

8. The method of claim 7, wherein said adjusted target number of bits, T', is adjusted in accordance with:

if $(B + T' > 0.9*B_s)$, then $T'' = \text{Max}(R_s/30, 0.9*B_s - B)$ and if $(B - R_p + T' < 0.1*B_s)$, then $T'' = R_p - B + 0.1*B_s$ where T" represents a second adjusted target bit rate and $R_p$ represents bits to be removed from said buffer per frame.

9. The method of claim 1, wherein said distortion measure is a mean absolute difference between said current frame and a previous frame.

10. The method of claim 1, wherein said distortion measure is a just noticeable difference (jnd) between said current frame and a previous frame.

11. The method of claim 1, wherein said image signal is a discrete cosine transformed (DCT) of a motion compensated image signal.

12. The method of claim 1, wherein said image signal is a discrete wavelet transformed (DWT) of a motion compensated image signal.

13. Apparatus for generating a quantizer scale to quantize an image signal having at least one frame, said apparatus comprising:

means for computing a distortion measure for a current frame in response to coding information from an immediate previous encoded portion;

means, coupled to said distortion measure computing means, for computing a target number of bits for encoding said current frame;

means, coupled to said distortion measure computing means and said target bit computing means, for computing at least one quantizer scale for said current frame from the computed distortion measure and computed target number of bits in accordance with a complexity measure having a polynomial form, where said polynomia form has at least two distortion measure terms, with each having a different weight; and means, coupled to said quantizer scale computing means, for quantizing said current frame with said computed quantizer scale.

14. The apparatus of claim 13, wherein said complexity measure comprises:

$$T = X_1 E Q^{-1} + X_2 E Q^{-2}$$

where T represents a target number of bits for encoding said current frame, $X_1$ and $X_2$ represent parameters, Q represents said quantizer scale and E represents said distortion measure.

15. A computer-readable medium having stored thereon a plurality of instructions, the plurality of instructions including instructions which, when executed by a processor, cause the processor to perform the steps comprising of:

(a) computing a distortion measure for a current frame in response to coding information from an immediate previous encoded portion;

(b) computing a target number of bits for encoding said current frame;

(c) computing at least one quantizer scale for said current frame from the computed distortion measure and computed target number of bits in accordance with a complexity measure having a polynomial form, where said polynomial form has at least two distortion measure terms, with each having a different weight; and (d) applying said computed quantizer scale to quantize said current frame.

16. The computer-readable medium of claim 15, wherein said complexity measure comprises:

$$T = X_1 E Q^{-1} + X_2 E Q^{-2}$$

where T represents a target number of bits for encoding said current frame, $X_1$ and $X_2$ represent parameters, Q represents said quantization scale and E represents said distortion measure.

17. The computer-readable medium of claim 15, wherein said distortion measure is a mean absolute difference between said current frame and a previous frame.

18. The computer-readable medium of claims 15, wherein said distortion measure is a just noticeable difference (jnd) between said current frame and a previous frame.

19. The computer-readable medium of claim 15, wherein said image signal is a discrete cosine transformed (DCT) of a motion compensated image signal.

20. The computer-readable medium of claim 15, wherein said image signal is a discrete wavelet transformed (DWT) of a motion compensated image signal.

21. Apparatus for encoding an image sequence having at least one input frame, said apparatus comprising:

means for computing a distortion measure for a current frame in response to coding information from an immediate previous encoded portion;

means, coupled to said distortion measure computing means, for computing a target number of bits for encoding said current frame;

means, coupled to said distortion measure computing means and said target bit computing means, for computing at least one quantizer scale for said current frame from the computed distortion measure and computed target number of bits in accordance with a complexity measure having a polynomial form, where said polynomial form has at least two distortion measure terms, with each having a different weight; and means, coupled to said quantizer scale computing means, for quantizing said current frame with said computed quantizer scale.

* * * * *

UNITED STATES PATENT AND TRADEMARK OFFICE
CERTIFICATE OF CORRECTION

PATENT NO.    : 6,243,497 B1
DATED         : June 5, 2001
INVENTOR(S)   : Chiang, Tihao and Zhang, Ya-Qin It is certified that error appears in the above-identified patent and that said Letters Patent is hereby corrected as shown below:

Column 13,
Line 56, "a target number of bits" should read -- said target number of bits --.

Signed and Sealed this

Thirteenth Day of September, 2005

JON W. DUDAS
*Director of the United States Patent and Trademark Office*